March 24, 1959  G. A. LYON  2,878,769
APPARATUS FOR MAKING WHEEL COVERS
Original Filed April 6, 1950  5 Sheets-Sheet 1
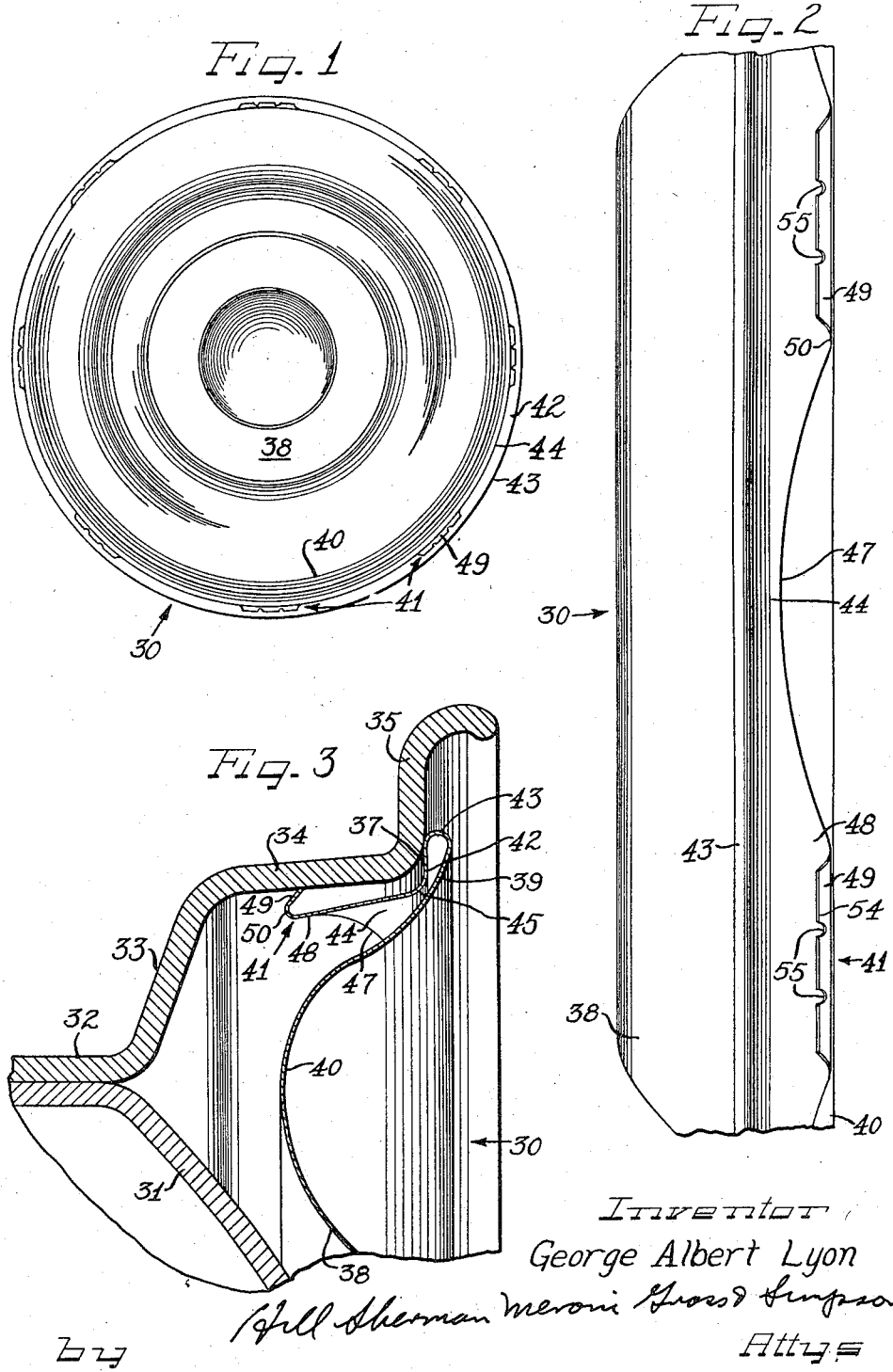
Inventor
George Albert Lyon
by Hill Sherman Meroni Gross & Simpson
Attys March 24, 1959  G. A. LYON  2,878,769
APPARATUS FOR MAKING WHEEL COVERS
Original Filed April 6, 1950  5 Sheets-Sheet 2
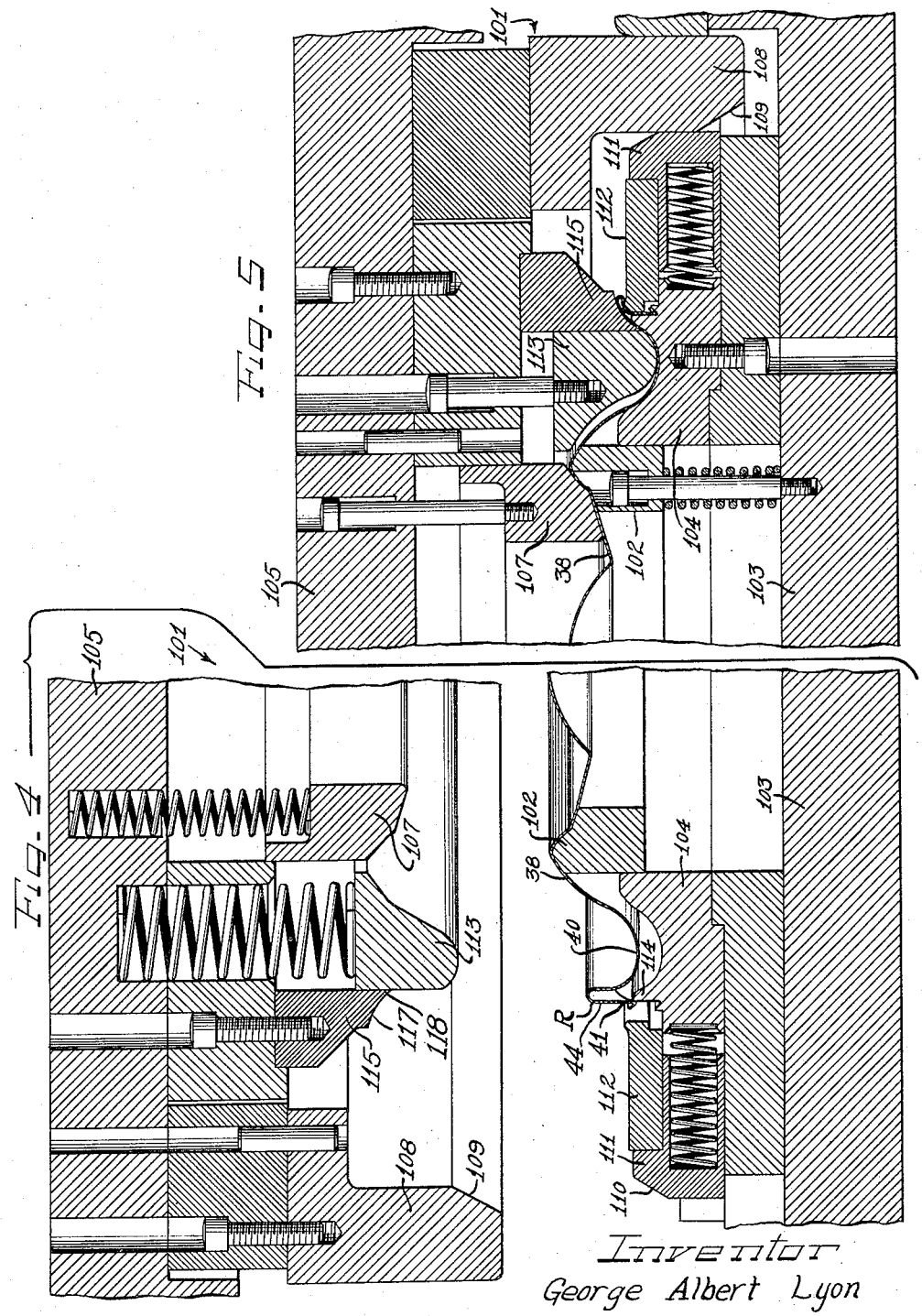
Inventor
George Albert Lyon
by The Firm of Charles Offield
Attys

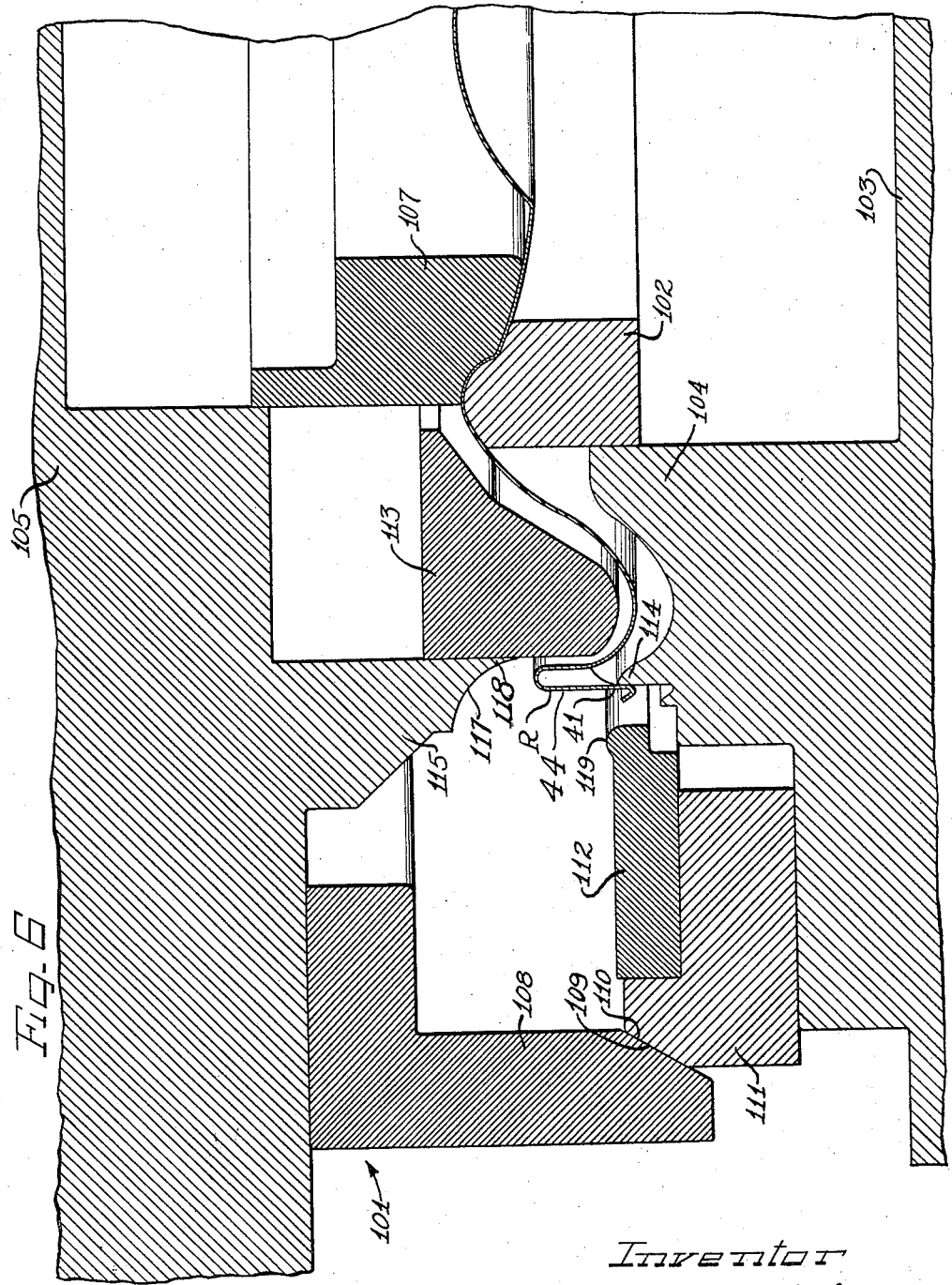

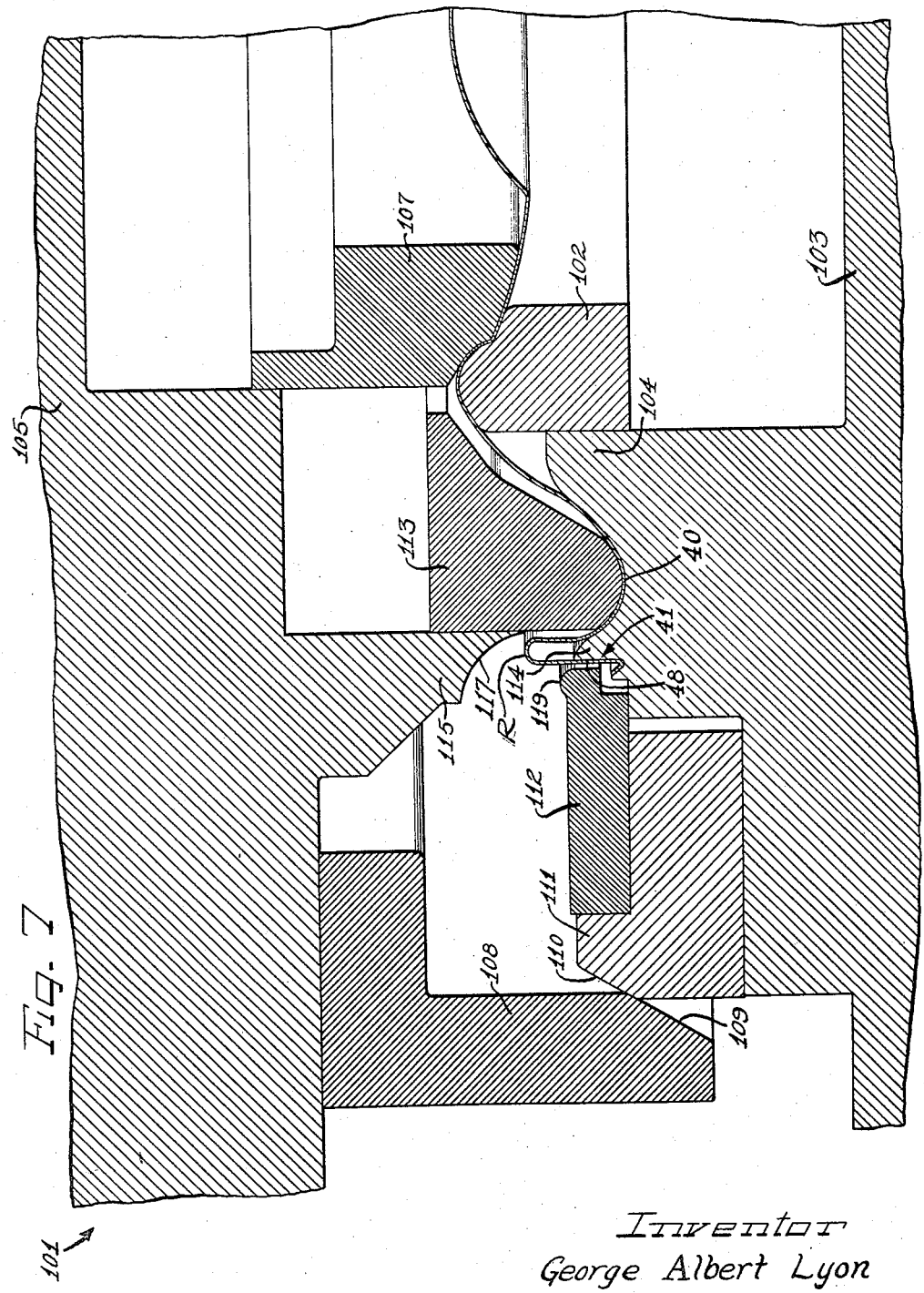

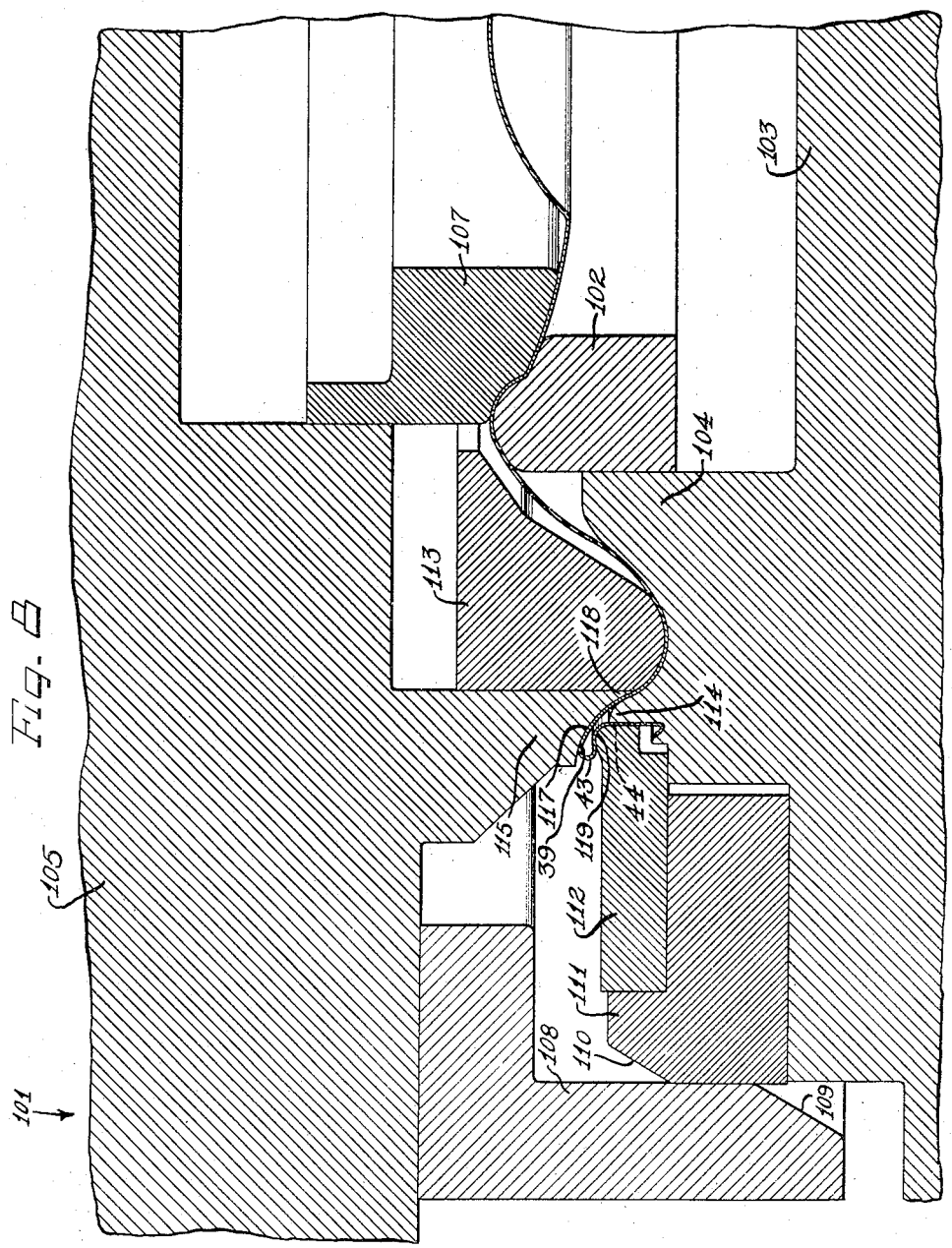

United States Patent Office 2,878,769
Patented Mar. 24, 1959

2,878,769

APPARATUS FOR MAKING WHEEL COVERS

George Albert Lyon, Detroit, Mich.

Original application April 6, 1950, Serial No. 154,221, now Patent No. 2,807,226, dated September 24, 1957. Divided and this application March 12, 1957, Serial No. 645,880

8 Claims. (Cl. 113—48)

The present invention relates to improvements in wheel covers such as are adapted to be applied to the outer sides of vehicle wheels, and more particularly concerns the provision of such covers having improved means for self-retention upon the wheels to which applied and novel means for making the covers with the self-retention means.

This application is a division of my application Serial No. 154,221, filed April 6, 1950.

An important object of the present invention is to provide an improved apparatus for making ornamental and protective covers for the outer sides of wheel structures and which covers can be easily and conveniently applied by reasonable manual pressure but which can in each instance be conveniently pried free from the wheel without damage either to the wheel or to the cover so that the cover is indefinitely reusable and the wheel from which the cover may be removed will be free from damage but will remain in proper condition to receive another similar cover with full efficiency.

Another object of the invention is to provide apparatus for shaping wheel covers to afford an especially advantageous cover-retaining relationship between the tire rim of a vehicle wheel and a wheel cover.

A further object of the invention is to provide an improved apparatus for shaping sheet metal blanks to provide ornamental wheel covers.

An additional object of the invention is to provide improved apparatus for making wheel covers or caps including means for turning over the juncture portion of the cover body and retaining flange structure to provide a radially outwardly extending fold margin overlying the cover retaining means.

Other objects, features and advantages of the present invention will be readily apparent from the following detailed description of a preferred embodiment taken in conjunction with the accompanying drawings in which:

Figure 1 is a rear elevational view of a wheel cover or cap embodying the features of the present invention;

Figure 2 is an enlarged fragmentary side elevational view of the cover of Figure 1;

Figure 3 is a fragmentary radial sectional view through a vehicle wheel showing the cover of Figures 1 and 2 applied to the outer side of the wheel;

Figures 4 and 5 are fragmentary radial sectional detail views through forming die apparatus, sometimes referred to as a restrike die assembly, showing the same in respectively the open and the fully closed conditions thereof and within which apparatus the axially extending marginal rib of the cover blank is turned into generally radially outwardly projecting retaining means overlying relation;

Figure 6 is a more or less schematic substantially enlarged vertical sectional view similar to Figure 4 showing the die assembly in an intermediate operative position;

Figure 7 is a vertical sectional view similar to Figure 6 but showing the die assembly in a further advanced intermediate operation condition; and Figure 8 is a vertical sectional view similar to Figure 7 showing the die assembly in the final cover-forming condition thereof.

A wheel cover 30 (Figure 1), made with apparatus according to the present invention, is constructed and arranged to be applied to the outer side of a wheel, such as an automobile wheel, including a wheel body 31 and a tire rim 32 (Fig. 3). Both the wheel body and the tire rim may be formed from appropriate heavy gauge sheet metal stamped or rolled to shape and the tire rim is of the multi-flange, drop center type adapted to support a pneumatic tire and tube assembly (not shown). To this end, the tire rim 32 includes a side flange 33 which extends generally radially outwardly, an intermediate generally axially outwardly and slightly radially outwardly tapered or generally frusto-conical intermediate flange 34, and a generally radially outwardly and axially outwardly extending terminal flange 35 which merges on a rounded shoulder 37 with the intermediate flange 34.

A significant feature of the cover 30 resides in the construction whereby the cover is self-retaining upon the wheel so that the wheel need not be equipped with any special structure or expedient for retaining the cover on the wheel. Thus, the wheel need have no special coverretaining clips, nor any holes formed therein to receive clips or parts of the cover, and no special grooves or protrusions or any other element or structure need be supplied on the wheel for retaining the cover, since the cover holds itself on the wheel. Furthermore, the cover 30 is so equipped with novel retaining means that it can be simply and easily applied to the wheel by simply pressing it into wheel covering, retained relation on the wheel. Removal of the cover from the wheel can be effected easily and expeditiously in the manner which has been customary for removal of automobile wheel hub caps, namely, by inserting a pry-off tool between the margin of the cover and the adjacent portion of the wheel and prying the cover from the wheel. In other words, means are provided for retaining the cover on the wheel in snap-on, pry-off relation.

Where desired, of course, the cover 30 could take the form of a trim which will substantially cover the outer side of the tire rim and an adjacent portion of the wheel body, while a central hub cap covers the central, bolt-on flange portion of the wheel, but in view of the modern trend toward ever smaller wheels and larger tires, a full disk cover or cap is highly desirable since a single cover member thereby suffices on each wheel rather than having two cover members. The latter desirable end is attained with unusual effectiveness and success in actual practice not only for new vehicles but also by way of replacement accessory for existing vehicles. Automobile manufacturers are adopting the cover of the present invention in ever increasing numbers because of its many inherent advantages.

From both a structural and economic viewpoint, the objectives of the present invention are attained by a fairly simple construction wherein the cover 30 is made entirely from a single piece of sheet metal, comprising a body portion 38 having a generally radially outwardly extending marginal portion 39 of a diameter to overlie the juncture shoulder 37 of the tire rim. In a preferred form the cover body radially inwardly from the marginal portion 39 is of dished, concave cross section providing a large radius generally axially inwardly extending rib 40 arranged to project into the relatively wide annular axially outwardly opening groove defined between the tire rim and the outwardly bulging wheel body 31. The central portion of the cover may be provided with any desired design configurations. The marginal portion 39 may be of convexly contoured cross sectional merging smoothly with the concave intermediate portion 40 of the cover.

Of the utmost importance are the structural features, characteristics and the functional relationships of the self-retaining means of the cover 30. To this end the outside diameter of the intermediate convex cover portion 40 is substantially less than the inside diameter of the tire rim intermediate flange 34 so as to provide a substantial radial space therebetween providing an ample clearance for novel retaining finger structure comprising an annular series of generally axially inwardly extending retaining fingers 41 formed integrally in one piece with the cover margin 39. For this purpose, the cover margin 39 comprises an underturned generally radially inwardly extending flange portion 42 having juncture with the outer exposed marginal portion 39 on a small radius bead-like radially outwardly projecting reinforcing rib juncture 43 which in assembly with the wheel lies at its axially inner side against the tire rim juncture shoulder 37 or the immediately adjacent portion of the terminal flange 35.

The underturned marginal flange 42 is provided with cover retaining finger means. In the form of Figure 1, the flange 42 is of a radial extent to project radially inwardly beyond and clear of the tire rim shoulder 37 and merges with an axially inwardly extending ring-like flange portion 44 from which the retaining fingers 41 extend integrally in one piece therewith. As best seen in Figures 3 and 4, the marginal finger-carrying flange portion 44 joins the underturned flange portion 42 on a juncture shoulder 45 which at least in the untensioned condition of the fingers is preferably spaced from the opposing inner face of the cover body. Further, the retaining finger flange 44 is accommodated in the space or clearance between the tire rim intermediate flange 34 and the adjacent inwardly projecting intermediate cover portion 40.

It will be observed (Figs. 1, 2 and 3) that the inwardly extending flange portion 44 of the retaining flange structure is formed on a circle concentric with the cover and with the tire rim intermediate flange 34 but is of substantially smaller diameter than the inner face of the tire rim intermediate flange to remain in spaced relation thereto. The flange 44 is, however, of greater diameter than the contiguous cover portion 40.

Each of the retaining fingers 41 extends axially inwardly in the plane of the flange 44 and comprises an integral extension in one piece with the flange, actually comprising annularly spaced portions of the flange. For this purpose, the flange portion 44 is recessed at uniformly spaced intervals as indicated at 47 to define the individual retaining finger extensions 41 which are thus provided with finger back or body portions or legs 48. By having the cutouts or recesses 47 of generally arch shape the finger extension bodies or backs 48 are of flaring outline from their tips to the flange 44. That is, the finger backs are of substantially greater width at juncture with the flange 44 than the width of the fingers at their terminal portions. Furthermore, by having the recesses 47 of arcuate outline, the edges defining the cutouts are without any angular notches or other angular juncture with the body of the flange 44, but the sides of adjacent finger backs 48 merge on a continuous arc. Since the flange 44 is circular, and the finger backs 48 are formed in the plane of the flange 44, the finger backs 48 are also arcuately curved transversely on the curvature of the flange 44 and are thereby substantially stiffened so that they resist bending when radial pressure is applied thereto.

Each of the distal edge or terminal portions of the retaining fingers 41 is formed with an angular generally radially outwardly and somewhat axially outwardly projecting gripping extremity leg or flange portion 49. These gripping portions are joined integrally in one piece with their extension back body portions 48 by means of respective rib-like junctures 50 which are arcuate both in length and in cross section and afford a substantial stiffening reinforcement between the finger back and terminal flange portions.

To assure stiffness in the finger terminal flange portions 49, they are formed quite short relative to the finger backing body portions 48. Thus, it will be observed that each of the terminal gripping flange portions 49 is only a small fraction as long as its finger backing body portion 48. In a practical form, the terminal flange portions 49 may be only about one-fourth as long as the length of the finger backing portions from the juncture 50 to the juncture shoulder 45 of the retaining flange structure. The finger back portions 48, on the other hand, are strongly resiliently flexible in radial direction relative to the cover margin 39, although by reason of the bowed transverse cross section the portions 48 themselves are very resistant to bending on lines transverse to their length, and because of the connection afforded between adjacent retaining fingers 41 by the continuous flange 44 substantial additional resilience will be inherent in the finger portions 48.

As an incident to applying the cover 30 to the outer side of the wheel, the retaining fingers are deflected radially inwardly from a substantially larger diameter about the tips 54 of the retaining terminal flanges 49 and this places the retaining fingers and the adjacent marginal structure including the flange 44 and the underturned flange 42 as well as the overlying marginal flange 39 under resilient tension operating to improve the retaining grip of the retaining finger terminals 54 with the opposing radially inwardly facing rim flange 34. Turning of the cover on the wheel is resisted by the corners of the gripping edges 54 of the finger terminals enhanced by additional corners afforded by intermediate notches 55 in the terminal edges.

Removal of the cover from the wheel is easily effected by applying a pry-off tool behind the underturned flange 42 and effecting pry-off force to slide the retaining finger terminals 54 axially outwardly along the face of the intermediate flange 34.

Further details of the function and advantages of the retaining fingers 41 are contained in my Patent No. 2,624,634, issued January 6, 1953.

In the manufacture of the cover 30, it is desirable that from an economy standpoint the cover be made from as inexpensive material as practicable. It is also desirable that the material lend itself easily to a commercially acceptable finish. Sheet steel is a desirable material for this purpose, and more especially stainless steel, preferably chorme-nickel steel. Among the valuable characteristics of such material is its ready workability in thin gauge stock and its ready adaptability to high lustrous polish and plating. Another and very important attribute of chrome-nickel steel sheet has been found to reside in the fact that although in the sheet before working it has primarily austenitic characteristics, it is capable of developing martensitic character on cold working. The material from which the cover 30 is made should have these characteristics because it is desirable to form the cover by drawing the metal sheet to form. An austenitic steel lends itself well to die forming but does not possess sufficient hardness and resilience to afford adequate tensioning of the retaining fingers for the cover. However, where the material is capable of developing martensitic character, that is hardness which is an attribute of a tempered, resilient steel it is possible to make the entire cover from a single piece of material, including not only the drawn body portion of the cover but also the resilient spring retaining flange and finger structure.

Highly desirable results have been obtained by using sheet steel such as 16 to 18–6 to 8 chrome-nickel or stainless steel of from .019 to .021 inch thickness or gauge. Such material will have a tensile strength of from approximately 100,000 to 125,000 pounds per square inch and a yield strength of from approximately 47,000 to approximately 49,000 pounds per square inch, while the elongation of a blank specimen subjected to tests will be from approximately 53% to 58%.

A preferred method of making the cover to attain the desired form and functional characteristics on an efficient economical mass production basis comprises drawing the body portion of the cover and then drawing and cold working the marginal flange and retaining finger portion of the cover to change the austenitic material into martensitic character in the marginal portions of the cover, having the hardness and resilience requisite for the self-retaining functions of the retaining fingers. For a more detailed understanding of this method, reference is made to my Patent No. 2,707,449, issued May 3, 1955.

The apparatus of the present application is especially suitable for use in the last step of the method wherein the marginal rib formation of the cover blank is turned radially outwardly into overlying relation to the cover retaining means and more particularly the axially extending flange structure providing such retaining means.

For such final forming step, the cover blank which has been formed up to provide the crown portion 38, the intermediate dished portion 40 and the axially extending flange 44 as well as the retaining finger extensions 41, with an annular axially outwardly projecting hollow rib R at juncture of the flange 44 with the radially outer side of the dished portion 40, is placed in forming apparatus comprising a die assembly 101 (Figs. 4 and 5). In this die assembly, the cover is placed upon a spring biased yieldable supporting and stripper ring 102 shaped complementary to the inside of the crown portion of the body 38 of the cover and carried by a base block or plate 103. The ring 102 supports the cover blank initially above a stationary hold-down clamping ring 104 the upper surface and upper outer margin of which are shaped complementary to the intermediate rib portion 40 of the cover and the retaining fingers 41.

Now, a die head 105 is brought down by suitable operating press means toward the base 103 until a yieldable hold-down and pressure ring 107 engages the cover body 38 above the supporting ring 102 (Fig. 6). At the same time a camming member 108 depending from the head member 105 engages with a beveled cam surface 109 against a complementary beveled cam surface 110 on the outer end of a reciprocable normally outwardly spring biased slide or cam die member 111 to initiate radially inward movement of the slide to carry a segmental finger gripping and forming block or finger 112 radially inwardly. It will be understood, of course, that there are as many of the cam die members 111 as required to engage entirely about the periphery of the cover blank as represented by the axially extending flange 44 and the fingers 41.

Further downward movement of the die head 105 carries a yieldable spring-biased hold-down ring 113 (Figs. 4 and 7) into the intermediate annular channel defined by the intermediate rib portion 40 of the cover and clamps the same against the complementary upwardly facing annular surface of the clamping and hold-down ring 104. This also positions the retaining fingers 41 against the complementary marginal surfaces of the supporting ring 104 which is provided with a back up ridge 114 extending behind the backs 48 of the retaining fingers in opposition to the inner ends of the segmental gripping fingers or blocks 112 which in the meantime are driven radially inwardly toward the backing ridge 114 by continuing movement of the cam surfaces 109 and 110 acting to drive the slide blocks 111 inwardly.

In the final increments of the stroke of the die head 105, the cam driving member 108 drives the slide blocks 111 to the full inward driving limit wherein the gripping segments 112 ram at their inner ends against the retaining finger backs 48 and the adjacent marginal cylindrical flange portion 44, thereby clamping the same tightly against the backing ridge 114.

Thereupon, means become active to bend the generally U-shaped cross-section rib R laterally and radially outwardly through and beyond the circle of the flange 44 into a position which is generally divergent relative to the body portion of the cover and at an angle to the dished surface 40 whereby to increase the overall diameter of the cover and with the flange 44 extending generally axially under the turned margin thus provided and radially inwardly thereof with the radially outer side of the rib R providing the underturned radially inwardly extending flange portion 42 joining the flange portion 44 on the juncture 45. In the present instance, this turning over and collapsing of the rib R is effected by means of a circular die member such as a restrike die ring 115 having a generally radially outwardly and axially inwardly facing oblique and herein a concavely curved annular lower forming surface 117 terminating in a sharp lower inner edge portion 118. The forming face or surface 117 drives down against the radially inner side of the marginal rib R and works the same radially outwardly to turn upon opposing forming surface means comprising herein rounded head portions 119 at the upper inner ends of the segmental die member 112. As a result, the herein curved hollow outer edge of the wheel cover disc is formed wherein the radially inner side of the marginal rib R becomes the generally radially outwardly extending outer exposed cover margin 39 and the top of the rib becomes part of the edge bead 43 while the radially outer side of the rib becomes the inturned flange portion 42. Also, the material of the bead in being thus folded or turned radially outwardly is substantially additionally cold worked whereby to impart additional hardness and resilience thereto. The structure of the cover is now completed and ready for use except for finishing such as polishing and plating.

On testing the finished retaining fingers and turned over hollow marginal formation of the cover for tensile and yield strentgh it will be found that they have greatly increased over these same factors in the original blank stock. For example in a cover made from chrome-nickel steel of approximately .020 gauge and tensile strength of approximately 106,000 p.s.i. and yield strength of 49,000 p.s.i. with an elongation of approximately 57%, it was found that the tensile strength had increased in the finger and cold worked marginal portion of the cover to 140,000 to 143,000 p.s.i. tensile strength and 127,000 p.s.i. yield strength with an elongation of only 10% to 29%, showing a great increase in hardness and resiliency of approximately that of tempered spring steel. In other words, there was an approximately 25% increase in tensile strength and an increase in yield strength of about 62%, with a reduction in elongation to far below 50% of that in the original blank.

On typical specimens of finished covers subjected to critical Rockwell hardness test with a superficial hardness tester, the results have shown that the hardness of the retaining fingers and retaining flange structure on the finished cover, where it is made from a material testing 71.5 on the 30–T scale, that is, the scale for testing relatively soft steel, increased to a hardness of 56 on the 30–N scale adjacent to the terminals of the retaining fingers and to 50 on the N scale at the marginal bead of the cover, the 30–N scale on the Rockwell tester indicating the hardness of tempered spring steel. This indicates a great increase in hardness over the hardness of the original stock, due to the cold working to which the marginal portions of the cover are subjected in making the cover.

This application is a continuation-in-part of my copending applications Serial No. 16,206, filed March 22, 1948, Serial No. 29,083, filed May 25, 1948, and Serial No. 45,323, filed August 20, 1948, all now abandoned, but copending with my application Serial No. 154,221 of which the present is a division, and showing various earlier species of the generic invention herein, the present application showing a form that has been found especially advantageous in commercial practice.

It will be understood that modifications and variations may be effected without departing from the scope of the novel concepts of the present invention.

I claim as my invention:

1. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and opposes the open end of said rib, a second die portion of said one die assembly located radially outwardly adjacent to said first portion and provided with a generally axially outwardly facing surface, the other of said die assemblies having a pressing member opposing said first die portion and engageable against the outer face of the cover inside said radially inner wall of the rib and operable to press the cover toward and into engagement with said first die portion, said other die assembly also having alongside and relatively reciprocable to said pressing member a forming die member provided with a forming face directed toward and opposing both the rib opposing part of said first die portion and said second die portion and the axially outer end of said cover rib, said forming face being angled in the cover-rib-opposing portion thereof to face generally radially outwardly and axially inwardly relative to the cover and being operable in a forming stroke of said forming die member toward said die portions to engage the radially inner wall of the cover rib and bend said rib generally radially outwardly and thereby force the radially outer rib wall onto said second die portion surface, and said die portions having respective generally axially extending opposed surfaces coacting to maintain said retaining flange extension against radial deflection during the rib bending forming stroke of said forming die member.

2. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and opposes the open end of said rib, a second die portion of said one die assembly located radially outwardly adjacent to said first portion and provided with a generally axially outwardly facing surface, the other of said die assemblies having a circular pressing member opposing said first die portion and engageable against the outer face of the cover to press the cover toward and into engagement with said first die portion, said pressing member having a cylindrical surface opposing said radially inner wall of the rib and of a length to extend substantially axially outwardly beyond the axially outer end of the rib in the pressing coaction with said first die portion, a forming die ring member slidably engaged about said cylindrical surface and of a width to lie opposite both the rib opposing portion of said first die portion and said second die portion and provided with a forming face angled in the cover-rib-opposing portion thereof to face generally radially outwardly and axially inwardly relative to the cover, said forming face being operable during a forming stroke of the ring die reciprocably relative to said pressing member to engage the radially inner wall of the cover rib and bend said rib generally radially outwardly and thereby force the radially outer rib wall onto said second die portion surface, and said die portions having respective generally axially extending opposed surfaces coacting to maintain said retaining flange extension against radial deflection during the rib bending forming stroke of said forming die ring member.

3. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and opposes the open end of said rib, a second die portion of said one die assembly located radially outwardly adjacent to said first portion and provided with a generally axially outwardly facing surface, the other of said die assemblies having a supporting structure, a pressing member reciprocably relatively yieldably carried by said supporting structure and opposing said first die portion to yieldably pressingly engage the outer face of the cover inside said radially inner wall of the rib to press the cover toward and into engagement with said first die portion, a forming die ring rigidly carried by said supporting structure about said pressing member and of a width to lie opposite both the rib opposing portion of said first die portion and said second die portion, said die ring having a forming face angled to face generally radially outwardly and axially inwardly relative to the cover and engageable in a forming stroke of said other die assembly to engage the radially inner wall of the cover rib and bend the rib generally radially outwardly and thereby force the radially outer rib wall onto said second die portion surface, and said die portions having respective generally axially extending opposed surfaces coacting to maintain said retaining flange extension against radial deflection during the rib bending forming stroke of said forming die ring member.

4. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and has an annular axially outwardly projecting rib projecting into the open end of said cover rib a limited distance, a second die portion of said one die assembly located radially outwardly adjacent to said first portion and provided with a generally axially outwardly facing surface, the other of said die assemblies having a pressing member opposing said first die portion and engageable against the outer face of the cover inside said radially inner wall of the cover rib and operable to press the cover toward and into engagement with said first die portion, said other die assembly also having alongside and relatively reciprocable to said pressing member a forming die member provided with a forming face directed toward and opposing both the annular rib of said first die portion and said second die portion and the axially outer end of said cover rib, said forming face being angled in the cover-rib-opposing portion thereof to face generally radially outwardly and axially inwardly relative to the cover and being operable in a forming stroke of said forming die member toward said die portions to engage the radially inner wall of the cover rib and bend said cover rib generally radially outwardly and thereby force the radially outer cover rib wall onto said second die portion surface, and said die portions having respective generally axially extending opposed surfaces coacting to maintain said retaining flange extension against radial deflection during the cover rib bending forming stroke of said forming die member.

5. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and has an annular axially outwarly projecting rib projecting into the open end of said cover rib a limited distance, a second die portion of said one die assembly located radially outwardly adjacent to said first die portion and provided with a generally axially outwardly projecting rib adjacent to said first die portion rib, the other of said die assemblies having a pressing member opposing said first die portion and engageable against the outer face of the cover inside said radially inner wall of the cover rib and operable to press the cover toward and into engagement with said first die portion, said other die assembly also having alongside and relatively reciprocable to said pressing member a forming die member provided with a forming face directed toward and opposing both of said die portion ribs and the axially outer end of said cover rib, said forming face being angled in the cover-rib-opposing portion thereof to face generally radially outwardly and axially inwardly relative to the cover and being operable in a forming stroke of said forming die member toward said die portions to engage the radially inner wall of the cover rib and bend said cover rib generally radially outwardly and thereby force the radially outer face of the radially inner cover rib wall onto said first die portion rib and at the same time force the radially outer cover rib wall onto the second die portion rib, and said die portions having respective generally axially extending opposed surface coacting to maintain said retaining flange extension against radial deflection during the cover rib bending forming stroke of said forming die member.

6. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and opposes the open end of said rib, a second die portion of said one die assembly comprising a plurality of segmental radially reciprocable die members located uniformly radially outwardly adjacent to and about said first die portion and collectively providing a generally axially outwardly facing forming surface, the other of said die assemblies having a pressing member opposing said first die portion and engageable against the outer face of the cover inside said radially inner wall of the rib and operable to press the cover toward and into engagement with said first die portion, said other die assembly also having alongside and relatively reciprocable to said pressing member a forming die member provided with a forming face directed toward and opposing both the rib opposing part of said first die portion and said second die portion and the axially outer end of said cover rib, said other die assembly in addition having means coactive with said segmental die members to drive the same radially inwardly toward said first die portion in advance of a forming stroke of said forming die member, said forming face being angled in the cover-rib-opposing portion thereof to face generally radially outwardly and axially inwardly relative to the cover and being operable in a forming stroke of said forming die member toward said die portions to engage the radially inner wall of the cover rib and bend said rib generally radially outwardly and thereby force the radially outer rib wall onto said second die portion surface, and said die portions having respective generally axially extending opposed surfaces coacting to maintain said retaining flange extension against radial deflection during the rib bending forming stroke of said forming die member.

7. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and has an annular axially outwarly projecting rib projecting into the open end of said cover rib a limited distance, a second die portion of said one die assembly located radially outwardly adjacent to said first die portion and comprising a radially reciprocable uniform set of segmental die elements having on their radially inner margins axially outwardly projecting segmental rib portions adapted in the radially innermost position of the die elements to form a substantially continuous annular forming rib adjacent to the rib on said first die portion, the other of said die assemblies having a pressing member opposing said first die portion and engageable against the outer face of the cover inside said radially inner wall of the cover rib and operable to press the cover toward and into engagement with said first die portion, said other die assembly also having alongside and relatively reciprocable to said pressing member a forming die member provided with a forming face directed toward and opposing both the annular ribs of said first die portion and said second die portion and the axially outer end of said cover rib, said other die assembly in addition having means coactive with said segmental die elements to drive the same radially inwardly toward said first die portion in advance of a forming stroke of said forming die member, said forming face being angled in the cover-rib-opposing portion thereof to face generally radially outwardly and axially inwardly relative to the cover and being operable in a forming stroke of said forming die member toward said die portions to engage the radially inner wall of the cover rib and thereby bend said cover rib generally radially outwardly and force the radially outer cover rib wall onto said segmental die element forming rib, and said first die portion and said die elements having respective generally axially extending opposed surfaces coacting to maintain said retaining flange extension against radial deflection during the cover rib bending forming stroke of said forming die member.

8. In apparatus for making sheet metal vehicle wheel covers wherein a circular cover body has axially inner and outer faces and in an intermediate stage of formation the cover body has a generally axially outwardly projecting and axially inwardly opening hollow marginal rib defined by radially inner and radially outer walls the latter of which has a generally axially inwardly projecting cover retaining flange extension: opposed complementary forming die assemblies and means for relatively reciprocating the die assemblies into a coactive forming stroke and then separation, one of said die assemblies having a first die portion which engages the inner face of the cover and has an annular axially outwardly projecting rib projecting into the open end of said cover rib a limited distance, a second die portion of said one die assembly located radially outwardly adjacent to said first die portion and comprising a radially reciprocable uniform set of segmental die elements having on their radially inner margins axially outwardly projecting segmental rib portions adapted in the radially innermost position of the die elements to form a substantially continuous annular forming rib adjacent to the rib on said first die portion, the other of said die assemblies having a pressing member opposing said first die portion and engageable against the outer face of the cover inside said radially inner wall of the cover rib and operable to press the cover toward and into engagement with said first die portion, said other die assembly also having alongside and relatively reciprocable to said pressing member a forming die member provided with a forming face directed toward and opposing both the annular rib of said first die portion and the annular rib of said second die portion and the axially outer end of said cover rib, said other die assembly in addition having means coactive with said segmental die elements to drive the same radially inwardly toward said first die portion in advance of a forming stroke of said forming die member, said forming face being angled in the cover-rib-opposing portion thereof to face generally radially outwardly and axially inwardly relative to the cover and being operable in a forming stroke of said forming die member toward said die portions to engage the radially inner wall of the cover rib and thereby bend said cover rib generally radially outwardly and force the radially outer cover rib wall onto said segmental element forming rib, and said first die portion and said die elements having respective generally axially extending opposed surfaces coacting to maintain said retaining flange extension against radial deflection during the cover rib bending forming stroke of said forming die member, said die segment elements having below said segmental rib portions thereof clearance recesses formed in the radially inner edges of the segments to accommodate preformed retaining terminal structure on said cover retaining flange extension.

References Cited in the file of this patent
UNITED STATES PATENTS

| | | |
|---|---|---|
| 782,141 | Kenny | Feb. 7, 1905 |
| 2,132,002 | Hight | Oct. 4, 1938 |
| 2,492,886 | Punte | Dec. 27, 1949 |
| 2,707,449 | Lyon | May 3, 1955 |
| 2,807,226 | Lyon | Sept. 24, 1957 |